(12) United States Patent
Kabbani et al.

(10) Patent No.: US 12,316,542 B2
(45) Date of Patent: May 27, 2025

(54) ADAPTIVE PACKET ROUTING

(71) Applicant: Microsoft Technology Licensing, LLC, Redmond, WA (US)

(72) Inventors: Abdul Kabbani, Menlo Park, CA (US); Torsten Hoefler, Pfaeffikon (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/122,572

(22) Filed: Mar. 16, 2023

(65) Prior Publication Data
US 2024/0314073 A1 Sep. 19, 2024

(51) Int. Cl.
*H04L 45/7453* (2022.01)
*H04L 43/0829* (2022.01)
*H04L 45/24* (2022.01)

(52) U.S. Cl.
CPC ...... *H04L 45/7453* (2013.01); *H04L 43/0841* (2013.01); *H04L 45/24* (2013.01)

(58) Field of Classification Search
CPC ...... H04L 45/7453; H04L 45/24; H04L 45/70
See application file for complete search history.

(56) References Cited

U.S. PATENT DOCUMENTS

| | | | | |
|---|---|---|---|---|
| 8,181,161 B2* | 5/2012 | Kollmann | ........... | G06F 11/3476 714/45 |
| 9,350,665 B2* | 5/2016 | Yeung | ................ | H04L 47/125 |
| 10,355,981 B1* | 7/2019 | Matthews | .............. | H04L 47/125 |
| 2008/0002599 A1* | 1/2008 | Yau | .......................... | H04L 45/36 370/310 |
| 2011/0013638 A1* | 1/2011 | Matthews | ............... | H04L 45/24 370/395.32 |
| 2020/0252300 A1* | 8/2020 | Levy-Abegnoli | ....... | H04L 45/70 |
| 2020/0366607 A1* | 11/2020 | Kommula | ........... | H04L 45/7453 |
| 2021/0111989 A1* | 4/2021 | Nainar | ................ | H04L 45/7453 |
| 2021/0336884 A1* | 10/2021 | Wang | .................. | H04L 45/7453 |
| 2021/0368029 A1* | 11/2021 | Zhang | ..................... | H04L 45/38 |

OTHER PUBLICATIONS

Hurst, Thomas, "Bloom Filter Calculator", [online]. Retrieved From the Internet: URL: <https://hur.st/bloomfilter/>, Feb. 25, 2022, 2 Pages.
International Search Report and Written Opinion received for PCT Application No. PCT/US2024/018586, Jun. 26, 2024, 15 pages.

* cited by examiner

*Primary Examiner* — Nam T Tran
(74) *Attorney, Agent, or Firm* — Schwegman Lundberg & Woessner, P.A.

(57) ABSTRACT

A computer implemented method includes encoding a packet in a source endpoint of a multi-path communication network, the packet having a hash seed for use by routers to route the packet through the multi-path communication network to a destination endpoint. Network performance is tracked for the packet at the source endpoint. The hash seed is modified as a function of the network performance. The packet is re-sent such that the modified hash seed is used to route the packet to the destination endpoint.

20 Claims, 4 Drawing Sheets

ADAPTIVE PACKET ROUTING

BACKGROUND

Many different strategies may be used to route data packets in networks. Equal-cost multi-path routing (ECMP) routes packets over multiple network paths between endpoints with equal routing priority. Multi-path routing can be used in conjunction with most routing protocols because it is a per-hop local decision made independently at each router. The use of ECMP can substantially increase bandwidth by load-balancing traffic over multiple paths.

There may be significant problems in deploying ECMP in practice when a link from a router is down. The link that is down will be removed from a list of available paths, but may have been the only link that was available for that router to send packets toward their destination. Packets may still reach the router but will be discarded, as the only path out of the link is still down.

SUMMARY

A computer implemented method includes encoding a packet in a source endpoint of a multi-path communication network, the packet having a hash seed for use by routers to route the packet through the multi-path communication network to a destination endpoint. Network performance is tracked for the packet at the source endpoint. The hash seed is modified as a function of the network performance. The packet is re-sent such that the modified hash seed is used to route the packet to the destination endpoint.

DETAILED DESCRIPTION

Figure 1:
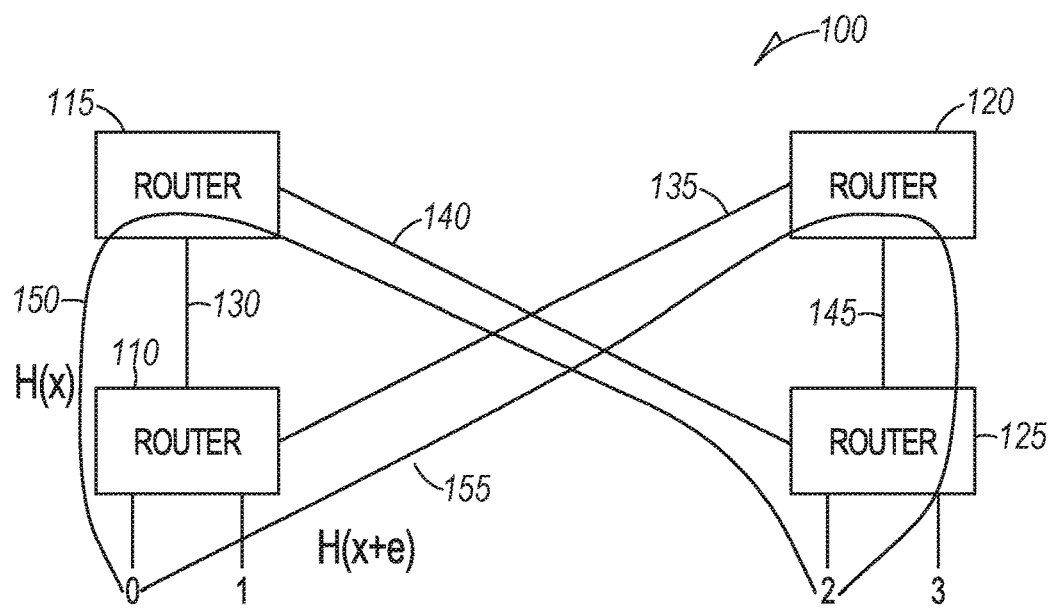
FIG. 1 is a block diagram illustrating route selection using a modified hash in a simple example two-level network according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Equal-cost multi-path routing (ECMP) enables oblivious path selection through routers in a multi-path data network based on a hash function $H(x)$, where x is a hash seed that is included in one or more of arbitrary fields in each packet. In ECMP, as each router receives a packet, the router looks up a set of possible candidate output ports for a given destination address and then uses $H(x)$ to select one. $H(x)$ is deterministic such that for the same x, the hash function always selects the same output port.

If a router determines that an adjacent link is down, the router will remove the adjacent link from the possible ECMP destinations and only forward packets on the remaining working links. This will change existing mappings that were routed to the broken link but likely also change all other mappings passing through the same switch. Since mapping decisions are made at each router, a problem arises for networks wherein a link from a given router is broken and the router may not have any valid alternative paths.

In a Clos network topology there is only one down path to a particular destination (endpoint) from each top router, also referred to as a top switch. Once a packet reaches a top switch, if a link on the down path from the top switch fails and some packets are still routed correctly to the top switch, those packets will not be able to reach the destination and will be discarded. ECMP cannot deal with this failure mode, and it needs to be addressed at the endpoints (source and destination network interface cards (NICs)) by avoiding specific top switches when sending packets to certain destinations with broken downstream paths.

An enhanced ECMP method to select new paths in response to poor network performance modifies the hash seed found in one or more fields of the packet to be $x'=x+e$. x may be a user datagram protocol (UDP) source port number in a packet. e, also referred to as an entropy enhancing portion, may be a random number from a random number generator, or may even incrementing number. e adds some entropy to the path determination at each switch, resulting in selection of a different path from that selected using x as a has seed with a high probability.

Predicting the exact mapping of $H(x')$ (or even $H(x)$) to a specific path is very difficult. The difficulty of predicting an exact mapping is largely due to issues with hard link failures that can change a topology of the network and result in a different valid set of paths.

FIG. 1 is a block diagram illustrating route selection using a modified hash in a simple example two-level Clos network 100 with four endpoints (0, 1, 2, and 3). Network 100 includes four nodes, such as routers 110, 115, 120, and 125. Routers 115 and 120 are top level routers. Endpoints 0 and 1 are part of router 110 and endpoints 2 and 3 are part of router 125. Router 110 has a connection 130 to router 115 and a connection 135 to router 120. A connection 140 connect router 115 to router 125, and a connection 145 connects router 120 to router 124.

Network 100 has a logical connection 150 from router 110 endpoint 0 to router 125 endpoint 2 that results with packet headers having hash seed x. If connection 140 breaks, packets on logical connection 150 move from endpoint 0 to router 115, but have no way to react endpoint 2 in router 125.

The source endpoint 0 will determine that the network is not performing well. The determination may be performed based on information regarding one or more packets using a current seed, x. Such information may include one or more of tracking a lack of received acknowledgements resulting in a time out, a threshold number of re-transmission of packets, or may be receiving data via network management infrastructure that packets are no longer being successfully routed to endpoint 2. In response, source endpoint 0 chooses a new hash seed by modifying packet headers. The packet headers may be modified in one example by changing the UDP source port randomly to generate a new seed: x'=x+e.

When a packet with a new hash seed is received at router 110, a different logical path 155 that uses connections 135 and 145 may result depending on the type of hash used and the length of the seed. If logical connection 150, which is broken, results using the new hash seed, the seed may be modified again iteratively to converge on the working logical path 155.

In one example, node 0 tracks that the hash seed x, and other hash seeds that result in logical connection 150, which is broken, should not be used, or, alternatively, that x+e, or a hash seed that ends up working, should be used. A table-based mechanism may be used to track non-working or working hash seeds.

For larger networks with large path diversity (exponentially in the number of layers of a Clos, with a large base exponent, e.g., 32^3), the number of desired entropies is very high. In one example, an entire 16 bit space of UDP ports may be used to modify the hash seed. Assuming a three-layer nonblocking Clos network with 64 port switches, each switch could use any of the 32 output ports (encoded as five bits). For all three decisions, one at each layer, 15 bits for modifying the hash seed (bits of entropy) may be used. Different numbers of bits may be used in further examples to ensure traffic is balanced well, with the number determined based on simulation, analytics, or may be determined heuristically by actual use of a network. Preliminary results show that the number of entropies for networks with two or three level Clos networks and 64-or-more port switches will likely be in the thousands per connection.

Even if a single link fails in such as network, a very large number of hash seeds may be affected (also exponential in the depth of a Clos). For example, assuming the same three-level Clos as above, there are 32,768 (2^15) possible paths for each source-destination pair (a fat tree would have one-half of that due to coalescing top-level switches). If any link fails, only one path for each source-destination pair is affected using a pseudo-random hash seed. It is resource intensive to remember all hash seeds for all N point-to-point connection per endpoint. Limiting the hash seeds may lead to worse path utilization und undesired/unforeseeable polarization effects (since each connection would be biased).

Figure 2:
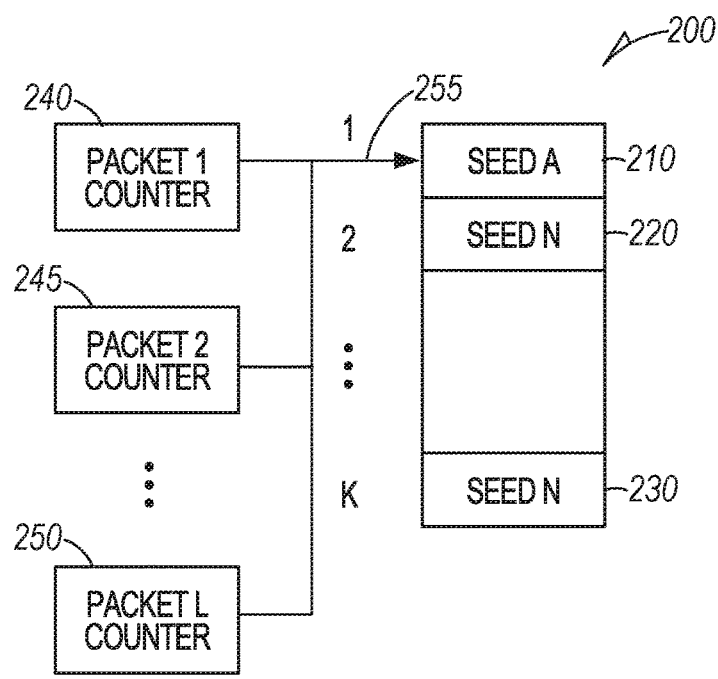
FIG. 2 is a cyclic buffer 200 for use in tracking hash seeds corresponding to broken paths according to an example embodiment.

FIG. 2 is a cyclic buffer 200 for use in tracking hash seeds corresponding to broken paths. To address failures and avoid sending packets into broken downstream paths, a history of the recently seen hash seeds corresponding to working paths is tracked. The history may be tracked by just recording the hash seeds corresponding to the last k seen ACK packets in buffer 200. The cyclic buffer 200 may be implemented in hardware or software. Each incoming ack's hash seed, SEED A at 210, SEED N at 220, . . . SEED P at 230 (which the packet carries in its header) is added to a cyclic buffer 200 or cache, potentially overwriting the oldest hash seed, currently shown as SEED P. Note that the letters associated with the seeds are not consecutive in one example, as the seeds need not be consecutive or sequential.

Packets may have a retransmission counter shown for each packet at 240, 245, 250, to keep track of how many times a packet has been retransmitted due to transmission failure. If the packet's retransmission counter expires, the expiration is likely due to a link failure. The packet is then sent along the next working path defined by the new hash seed, and the (cyclic) working path counter is incremented by one. The working path counter initially points as shown at 255 to the first entry.

One benefit of having multiple cache entries is to avoid transient imbalances that could be caused by buffer delays in the network. If k is too small, then a delay in either receiving new ACKs or a large number of packets timing out in a short timeframe may send many packets along the same path leading to additional imbalance (which may amplify randomly). If those packets are sent round-robin through k paths, this effect is mitigated. k may be 2 or 3 or more, and vary in different examples. A k of 1 may work for some multi-path networks but may result in transient imbalances as described above.

The use of the cyclic cache works well for timed out packets and for large flows of packets, as the hash seed for each packet in the flow will be the same. Flows will converge over a fairly short time to a good distribution among active paths of the multipath network, achieving better throughput.

Figure 3:
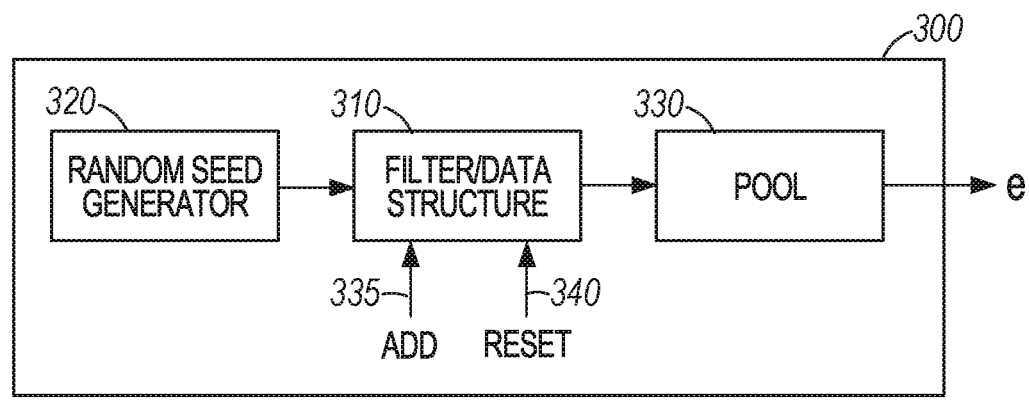
FIG. 3 is a block diagram illustrating generation of hash seed modifications according to an example embodiment.

FIG. 3 is a block diagram illustrating generation of hash seed modifications at 300. New packets for different packet flows may still be sent along a dead path with a certain probability as the hash seed for new packets may be different. For new packet flows, a data structure 310, such as a Bloom filter (described in further detail below), may be used to efficiently filter hash seeds corresponding to bad paths or poor network performance at an originating endpoint, referred to as a source.

In one example, whenever j packets with the same hash seed time out and are retransmitted, the according hash seed is added to the data structure 310. j may be one or more. The generation of new seeds, such as by using a random number generator 320, also referred to as a random entropy generator, is now a bit more complex in that it keeps a pool 330 of hash seeds that do not match the bloom filter when added at 335.

The pool 330 enables decoupling the production rate of the filtered random number generator 320 from the packet consumption rate of the NIC packet pipeline of the source endpoint. The NIC packet pipeline should run at line-rate (process packets as received) and cannot accept the occasional hiccup due to filtering. The size of the bloom filter when used as data structure 310 may be selected via simulation or heuristically to avoid buffering.

The Bloom filter may occasionally be cleared via reset 340 to re-enable entropies to make use of connections that have been repaired. Clearing can be done either in fixed time intervals or after the Bloom filter reaches a certain fill-in such as 15% of the bits having been set.

The Bloom filter is a data structure to implement approximate set membership with false positives but no false negatives. The use of the Bloom filter enables filtering all broken paths very efficiently but also, potentially, reduces the number of valid entropies. This can introduce a small bias in path selection and utilization.

The Bloom filter is characterized by two parameters: a number of bits m and a number of hash functions k. Each arriving set membership query x is hashed by all hash functions $H\_1(x), \ldots, H\_k(x)$ (potentially in parallel). Then, the Bloom filter tests whether all bits $B[H\_1(x)], \ldots, B[H\_k(x)]$ are set. If all bits are set, then x is assumed to be in the set. An insert performs the same k hash functions but instead of testing for the k bits to be set, it sets those bits. Thus, it's obvious to see that if an element has been inserted, it will always be found, but if m and/or k are too small or hash functions collide, false elements y, that have never been inserted, may also be found in the set.

Hash functions are usually expensive. The only requirement they need to fulfil is that they cover m slots well in expectation. Thus, if inputs are numbers uniformly sampled from 16 bits, any log_2(m) subset of the bits can be taken as a hash function. Of course, each bit should be represented equally often in the k hash functions.

To cover up to 128 true failed entropies and m=1024. Ten bits may be used as output for each hash function which may be simply selected from the 16 bits input. Given k=8 hash functions, 80 bits are selected in a way to have each bit of x represented in exactly 5 hash functions. Since the hash function implementation is a bounded degree selection circuit and querying the Bloom filter is trivial, the circuit may take very little overhead and time so that it can be performed in a single processor. Once the circuit is filled to 128, it could be reset—or, one could keep multiple circuits around in a round-robin window configuration to keep recently discovered failed entropies. The configurations, m, k, and the resulting bias of false positives may be evaluated in simulation.

In one example multi-path network, there is a path-selection data structure 310 for each connection. One data structure per destination may be used if the entropy (hash seed) is shared across connections. This can easily be achieved by configuring ECMP to just assign the source port as x instead of an entire source port identifier or tuple. The memory requirement per connection is reduced by reducing the memory/state requirement per connection.

Figure 4:
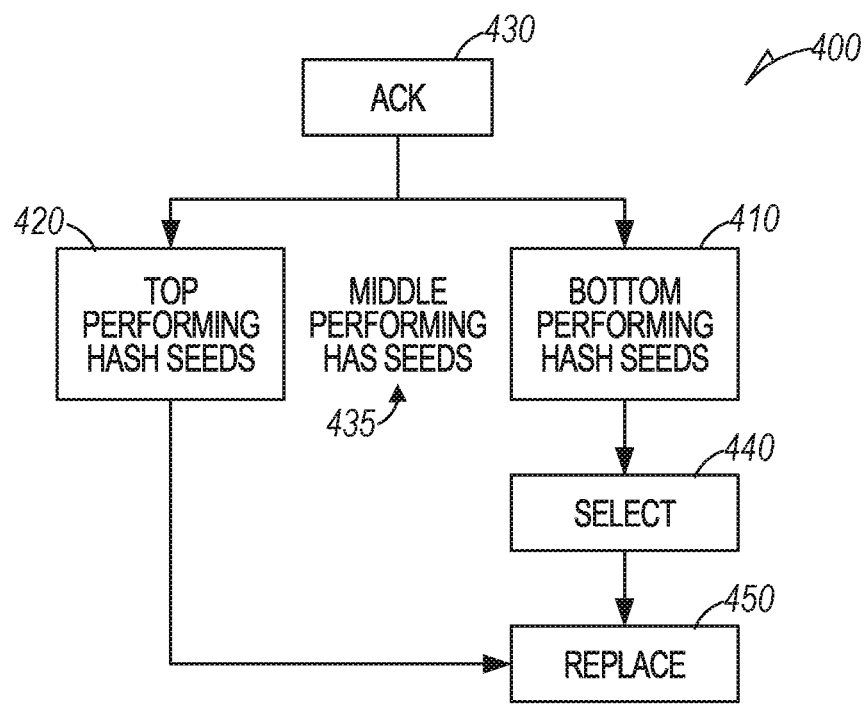
FIG. 4 illustrates the use of performance-based hash seed allocation for enhanced load balancing according to an example embodiment.

FIG. 4 illustrates the use of performance-based hash seed allocation for enhanced load balancing generally at 400. For load balancing, instead of keeping a cache of hash seeds corresponding to working paths, multiple caches of hash seeds corresponding to working paths may be kept with different network congestion characteristics. In the simplest form, two caches may be used. A cache 410 may be used for slow paths and a cache 420 for fast paths. For each incoming packet ACK 430, a corresponding hash seed may be added to the one or the other (based on either explicit congestion notification (ECN) markings or directly its round-trip time (RTT), or a mix of both. Multiple gradings for the caches may be used in some examples. In any case, the selection and insertion is much less expensive than a table-based scheme with ternary content addressable memory(s) (TCAMs).

In one example, selection of fast and slow paths may based on statistics on RTT. Packets in the fastest or top 10% are added to the fast path cache 420 and the slowest or bottom 10% are added to the slow paths cache 410. All others are middle performers 435 need not be cached. Parameters, α and β correspond to the 10% or other thresholds for determining the performance and may be estimated for simple classification in hardware. Updating those parameters may be performed on software using a small control processor.

Re-routing may be initiated if a path gets too slow. In one example, connections in the slow path's cache may be rerouted by simply selecting a slow path hash seed at 440 and replacing it at 450 with a hash seed from the fast path cache 420. To avoid path flapping, the standard deviation of an RTT distribution may be observed and used to only re-route outlier paths. This can be done even at the cache selection phase, without the use of percentiles to admit to the caches but actually use some distance from the mean/standard deviation metric. If the bottom 10% is rerouted into the top 10%, the deviation (width) of the distribution will be reduced over time.

The use of such re-routing should eventually converge to an optimal set of paths with much less memory than storing all paths. Rerouting may be stopped in response to β−α falling below a re-routing threshold based on the distribution being narrow enough. Dynamic parameters may be adjusted to achieve desired convergence and memory utilization. Simulations may also be used to adjust parameters.

Keeping α and β in hardware is straight forward. Assuming N "fastest" entropies are to be remembered (slowest are similar and can re-use the same hardware). An array A of size N+1 may be use and initialized with zeros. The array may be maintained in sorted order. A newly incoming ACK's RTT (or other congestion metric that has an order defined) is compared to A[N−2], the next-to-the last entry of A. If the RTT is larger, it is added A[N−1] and re-sort the array. Re-sorting may be implemented efficiently with a sorting network which could be re-used across connections. A single-cycle sort may be used for small/reasonable N, for each incoming ACK since the array is mostly sorted.

Figure 5:
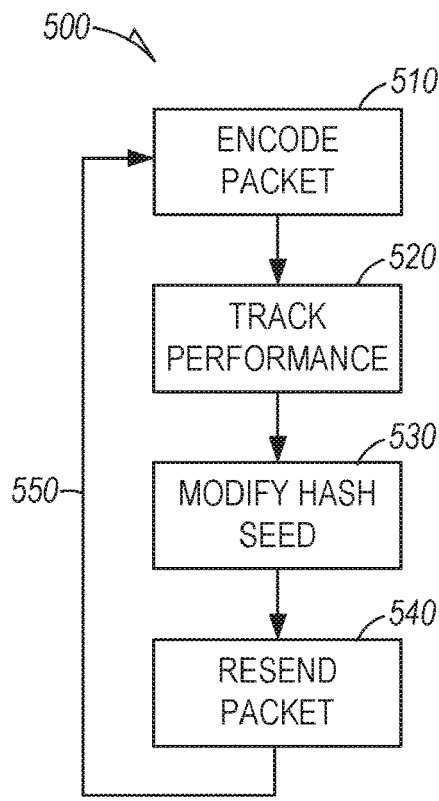
FIG. 5 is a flowchart illustrating a computer implemented method for modifying path routes for packets based on network performance according to an example embodiment.

FIG. 5 is a flowchart illustrating a computer implemented method 500 for modifying path routes for packets based on network performance. Method 500 begins at operation 510 by encoding a packet in a source endpoint of a multi-path communication network. The packet has a hash seed for use by routers to route the packet through the multi-path communication network to a destination endpoint. In one example, the multi-path communication network is a Clos network utilizing equal-cost multi-path routing (ECMP).

At operation 520, network performance for the packet is tracked at the source endpoint. Tracking performance of the network may include tracking at least one of a number of timeouts for acknowledgement of the packet, a number of retransmission of packets having the same hash seed, or receiving explicit congestion notification (ECN), or round-trip time (RTT) or combinations thereof.

The source endpoint will modify the hash seed at operation 530 as a function of the network performance and then re-send the packet with the modified hash seed at operation 540 such that the modified hash seed is used to route the packet to the destination endpoint. By modifying the hash seed, it is likely that a different route will be used for the packet to improve packet routing performance. In one example, the hash seed is modified based on a random number generator.

Method 500 may be performed iteratively as indicated at 550 by modifying packet hash seeds in response to tracked network performance being indicative of a poor or failed connection.

Figure 6:
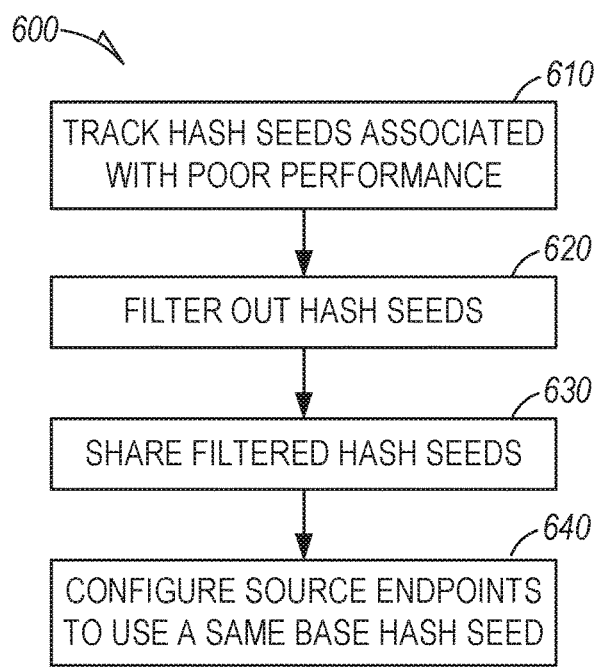
FIG. 6 is a flowchart illustrating a method of filtering out hash seeds to optimize hash seed modification according to an example embodiment.

FIG. 6 is a flowchart illustrating a method 600 of filtering out hash seeds to optimize hash seed modification. Method 600 begins at operation 610 by tracking hash seeds that resulted in tracked network performance being indicative of a poor or failed connection. The tracked hash seeds are filtered out at operation 620 from being used for packets to be transmitted. In one example, the hash seeds are tracked in a k-entry cyclic buffer where k is an integer of 2 or greater.

Method 600 may continue by sharing a data structure identifying tracked hash seeds between multiple endpoints at operation 630. The source endpoints are configured at operation 640 to use a same base hash seed corresponding to a source port identifier to facilitate use of the data structure in selecting new hash seeds. In one example, a Bloom filter may be used as the data structure to track the hash seeds corresponding to tracked network performance being indicative of a poor or failed connection.

Figure 7:
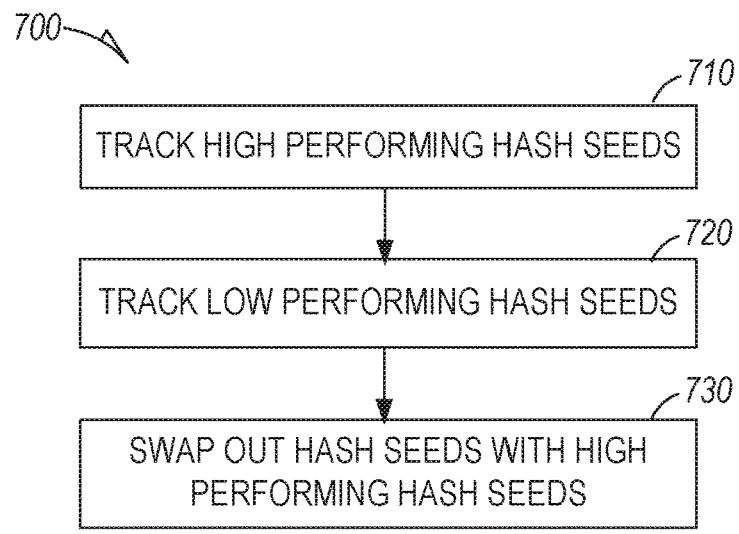
FIG. 7 is a flowchart illustrating a method 700 of selecting hash seed based on measured performance of prior used hash seeds according to an example embodiment.

FIG. 7 is a flowchart illustrating a method 700 of selecting hash seeds based on measured performance of prior used hash seeds. Method 700 begins at operation 710 by tracking hash seeds associated with high performing packet transmission in a high performing list. Operation 720 tracks hash seeds associated with low performing packet transmission in a low performing list. The high and low performing lists may be in separate caches or a single memory space or cache that logically identifies the high and low performing hash seeds. Operation 730 swaps out hash seeds from the tracked low performing packet transmission with hash seeds from the high performing packet transmission for use for further packet transmission.

In one example, the high performing packet transmission hash seeds are associated with packets having round trip times in a top ten percent of round-trip times and low performing packet transmission hash seeds are associated with packets having round trip times in a bottom ten percent.

Figure 8:
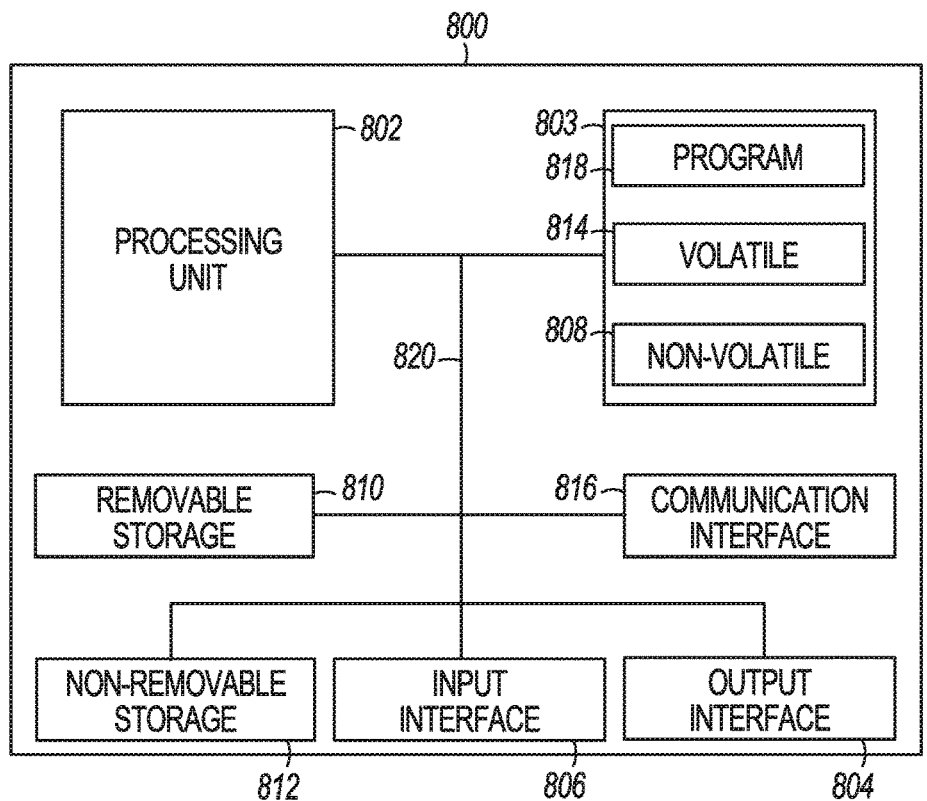
FIG. 8 is a block schematic diagram of a computer system to implement one or more example embodiments.

FIG. 8 is a block schematic diagram of a computer system 800 to generate modified hash seeds based on network performance and for performing methods and algorithms according to example embodiments. All components need not be used in various embodiments.

One example computing device in the form of a computer 800 may include a processing unit 802, memory 803, removable storage 810, and non-removable storage 812. Although the example computing device is illustrated and described as computer 800, the computing device may be in different forms in different embodiments. For example, the computing device may instead be a smartphone, a tablet, smartwatch, smart storage device (SSD), or other computing device such as circuitry including the same or similar elements as illustrated and described with regard to FIG. 8. Devices, such as smartphones, tablets, and smartwatches, are generally collectively referred to as mobile devices or user equipment.

Although the various data storage elements are illustrated as part of the computer 800, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 803 may include volatile memory 814 and non-volatile memory 808. Computer 800 may include—or have access to a computing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 800 may include or have access to a computing environment that includes input interface 806, output interface 804, and a communication interface 816. Output interface 804 may include a display device, such as a touchscreen, that also may serve as an input device. The input interface 806 may include one or more of a touchscreen, touchpad, mouse, keyboard, camera, one or more device-specific buttons, one or more sensors integrated within or coupled via wired or wireless data connections to the computer 800, and other input devices. The computer may operate in a networked environment using a communication connection to connect to one or more remote computers, such as database servers. The remote computer may include a personal computer (PC), server, router, network PC, or other common data flow network switch, or the like. The communication connection may include a Local Area Network (LAN), a Wide Area Network (WAN), cellular, Wi-Fi, Bluetooth, or other networks. According to one embodiment, the various components of computer 800 are connected with a system bus 820.

Computer-readable instructions stored on a computer-readable medium are executable by the processing unit 802 of the computer 800, such as a program 818. The program 818 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 818 along with the workspace manager 822 may be used to cause processing unit 802 to perform one or more methods or algorithms described herein.

EXAMPLES

1. A computer implemented method includes encoding a packet in a source endpoint of a multi-path communication network, the packet having a hash seed for use by routers to route the packet through the multi-path communication network to a destination endpoint. Network performance is tracked for the packet at the source endpoint. The hash seed is modified as a function of the network performance. The packet is re-sent such that the modified hash seed is used to route the packet to the destination endpoint.

2. The method of example 1 wherein the multi-path communication network is network utilizing equal-cost multi-path routing (ECMP).

3. The method of any of examples 1-2 wherein tracking network performance of the network includes tracking at least one of a number of timeouts for acknowledgement of the packet, a number of retransmission of packets having a same hash seed, or receiving explicit congestion notification (ECN), or round-trip time (RTT) or combinations thereof.

4. The method of any of examples 1-3 wherein the hash seed is modified based on a random number generator.

5. The method of any of examples 1-4 and further including iteratively modifying packet hash seeds in response to tracked network performance being indicative of a poor or failed connection.

6. The method of example 5 and further including tracking hash seeds that resulted in tracked network performance being indicative of a poor or failed connection and filtering out the tracked hash seeds from being used for packets to be transmitted.

7. The method of example 6 wherein hash seeds are tracked in a k-entry cyclic buffer where k is an integer of 2 or greater.

8. The method of any of examples 6-7 and further including sharing a data structure identifying tracked hash seeds between multiple endpoints and configuring source endpoints to use a same base hash seed corresponding to a source port identifier.

9. The method of any of examples 6-8 and further including utilizing a Bloom filter to track the hash seeds corresponding to tracked network performance being indicative of a poor or failed connection.

10. The method of any of examples 5-9 and further including tracking hash seeds associated with high performing packet transmission in a high performing list, tracking hash seeds associated with low performing packet transmission in a low performing list, and swapping out hash seeds from the tracked low performing packet transmission with hash seeds from the high performing packet transmission for use for further packet transmission.

11. The method of example 10 wherein high performing packet transmission hash seeds are associated with packets having round trip times in a top ten percent of round trip times and low performing packet transmission hash seeds are associated with packets having round trip times in a bottom ten percent.

12. A machine-readable storage device has instructions for execution by a processor of a machine to cause the processor to perform operations to perform any of the methods of examples 1-11.

13. A device includes a processor and a memory device coupled to the processor and having a program stored thereon for execution by the processor to perform operations to perform any of the methods of examples 1-11.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
encoding a packet in a source endpoint of a multi-path communication network, the packet having a hash seed for use by routers to route the packet through the multi-path communication network to a destination endpoint;
tracking, by the source endpoint, network performance for the packet;
modifying the hash seed in the packet as a function of the network performance; and
re-sending the packet such that the modified hash seed is used to route the packet to the destination endpoint.

2. The method of claim 1 wherein the multi-path communication network is network utilizing equal-cost multi-path routing (ECMP).

3. The method of claim 1 wherein tracking network performance of the network comprises tracking at least one of a number of timeouts for acknowledgement of the packet, a number of retransmission of packets having a same hash seed, or receiving explicit congestion notification (ECN), or round-trip time (RTT) or combinations thereof.

4. The method of claim 1 wherein the hash seed is modified based on a random number generator.

5. The method of claim 1 and further comprising iteratively modifying packet hash seeds in response to tracked network performance being indicative of a poor or failed connection.

6. The method of claim 5 and further comprising:
tracking hash seeds that resulted in tracked network performance being indicative of a poor or failed connection; and
filtering out the tracked hash seeds from being used for packets to be transmitted.

7. The method of claim 6 wherein hash seeds are tracked in a k-entry cyclic buffer where k is an integer of 2 or greater.

8. The method of claim 6 and further comprising:
sharing a data structure identifying tracked hash seeds between multiple endpoints; and configuring source endpoints to use a same base hash seed corresponding to a source port identifier.

9. The method of claim 6 and further comprising utilizing a Bloom filter to track the hash seeds corresponding to tracked network performance being indicative of a poor or failed connection.

10. The method of claim 5 and further comprising:
tracking hash seeds associated with high performing packet transmission in a high performing list;
tracking hash seeds associated with low performing packet transmission in a low performing list; and
swapping out hash seeds from the tracked low performing packet transmission with hash seeds from the high performing packet transmission for use for further packet transmission.

11. The method of claim 10 wherein high performing packet transmission hash seeds are associated with packets having round trip times in a top ten percent of round trip times and low performing packet transmission hash seeds are associated with packets having round trip times in a bottom ten percent.

12. A machine-readable storage device having instructions for execution by a processor of a machine to cause the processor to perform operations to perform a method, the operations comprising:
encoding a packet in a source endpoint of a multi-path communication network, the packet having a hash seed for use by routers to route the packet through the multi-path communication network to a destination endpoint;
tracking, by the source endpoint, network performance for the packet;
modifying the hash seed in the packet as a function of the network performance; and
re-sending the packet such that the modified hash seed is used to route the packet to the destination endpoint.

13. The device of claim 12 wherein the multi-path communication network is network utilizing equal-cost multi-path routing (ECMP).

14. The device of claim 12 wherein tracking network performance of the network comprises tracking at least one of a number of timeouts for acknowledgement of the packet, a number of retransmission of packets having a same hash seed, or receiving explicit congestion notification (ECN), or round-trip time (RTT) or combinations thereof.

15. The device of claim 12 wherein the operations further comprise iteratively modifying packet hash seeds in response to tracked network performance being indicative of a poor or failed connection.

16. The device of claim 15 wherein the operations further comprise:
tracking hash seeds that resulted in tracked network performance being indicative of a poor or failed connection; and
filtering out the tracked hash seeds from being used for packets to be transmitted.

17. The device of claim 15 wherein the operations further comprise:
sharing a data structure identifying tracked hash seeds between multiple endpoints; and
configuring source endpoints to use a same base hash seed corresponding to a source port identifier.

18. The device of claim 15 wherein the operations further comprise:
tracking hash seeds associated with high performing packet transmission in a high performing list;
tracking hash seeds associated with low performing packet transmission in a low performing list; and
swapping out hash seeds from the tracked low performing packet transmission with hash seeds from the high performing packet transmission for use for further packet transmission.

19. A device comprising:
a processor; and
a memory device coupled to the processor and having a program stored thereon for execution by the processor to perform operations comprising:
encoding a packet in a source endpoint of a multi-path communication network, the packet having a hash seed for use by routers to route the packet through the multi-path communication network to a destination endpoint;
tracking, by the source endpoint, network performance for the packet;
modifying the hash seed in the packet as a function of the network performance; and
re-sending the packet such that the modified hash seed is used to route the packet to the destination endpoint.

20. The device of claim 19 wherein the multi-path communication network is network utilizing equal-cost multi-path routing (ECMP) and wherein the operations further comprise iteratively modifying packet hash seeds in response to tracked network performance being indicative of a poor or failed connection.

* * * * *